June 11, 1957 L. W. DYER ET AL 2,795,766
TERMINAL CONSTRUCTION FOR CIRCUIT BREAKER
Filed June 18, 1952 3 Sheets-Sheet 1
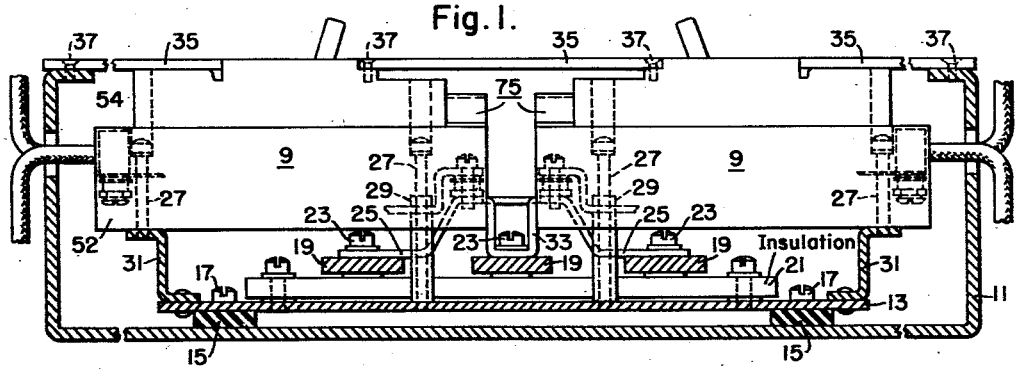
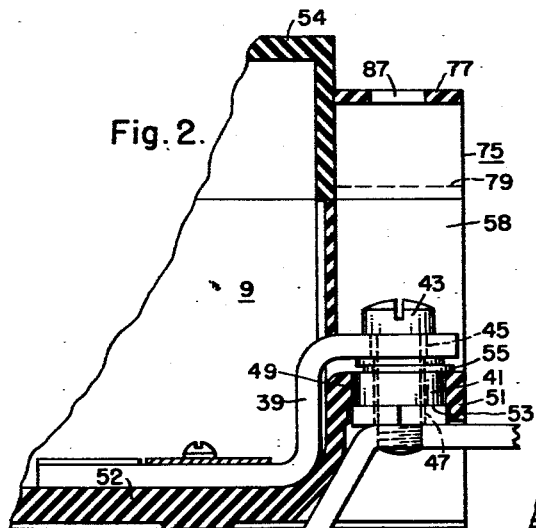
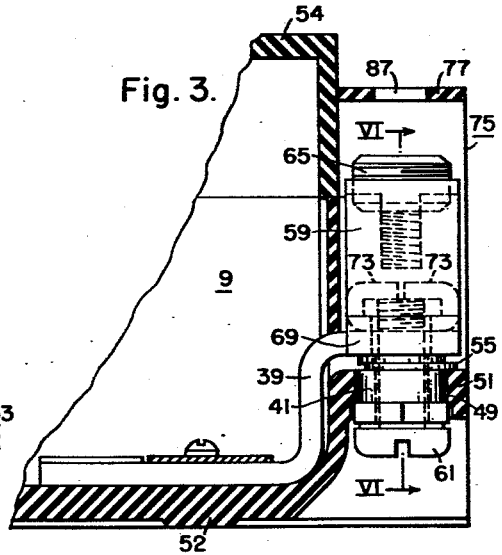
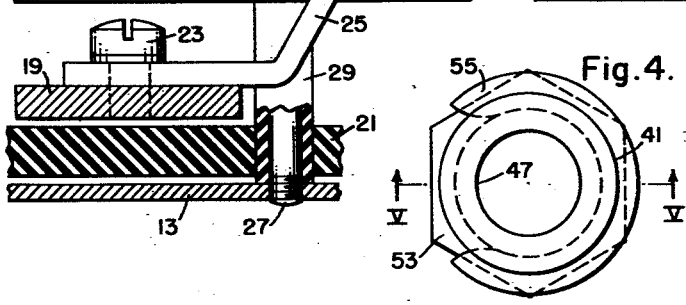
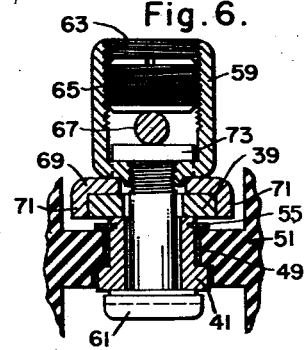
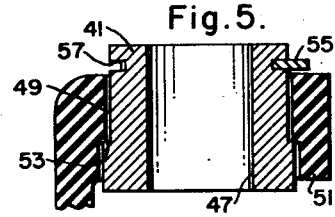
WITNESSES:
Robert A. Baird
Paul H. Harlin
INVENTORS
Lloyd W. Dyer &
Charles L. Jones.
BY
Ralph H. Swingle
ATTORNEY

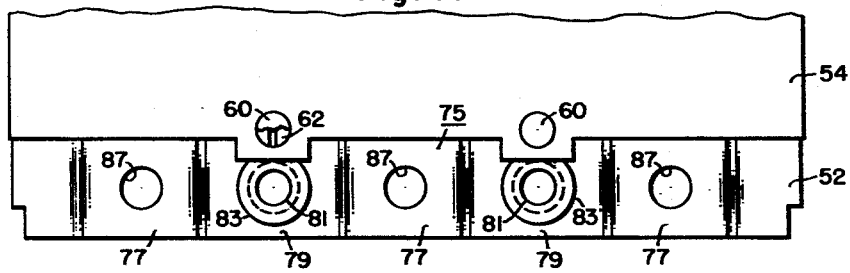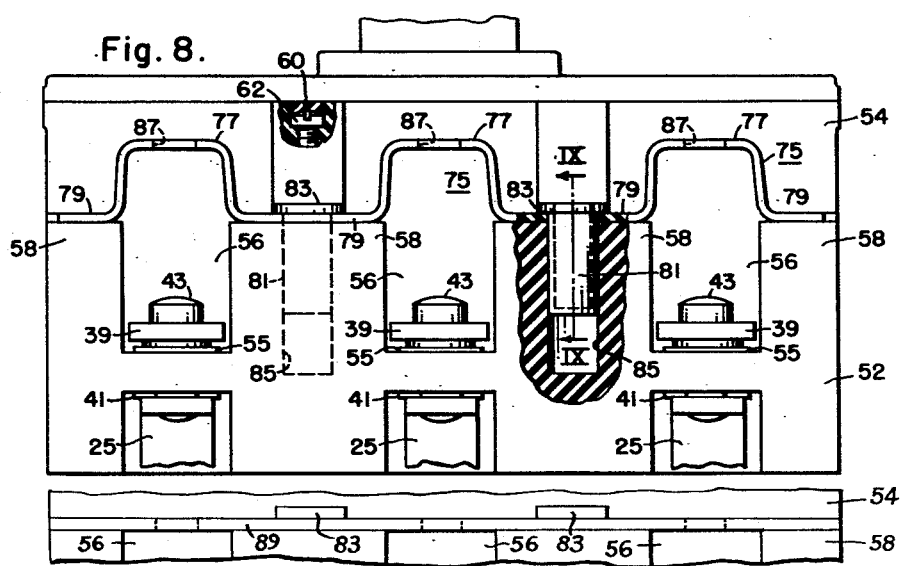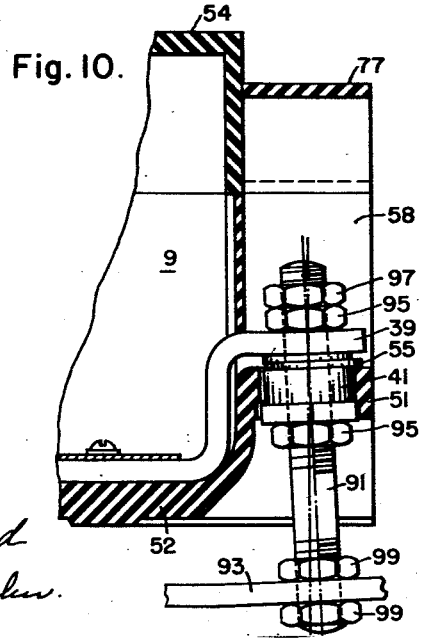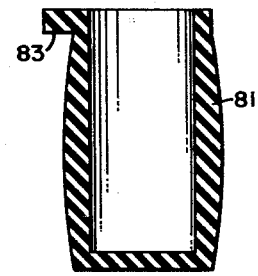

June 11, 1957 L. W. DYER ET AL 2,795,766
TERMINAL CONSTRUCTION FOR CIRCUIT BREAKER
Filed June 18, 1952 3 Sheets-Sheet 3

United States Patent Office 2,795,766
Patented June 11, 1957

2,795,766
TERMINAL CONSTRUCTION FOR CIRCUIT BREAKER

Lloyd W. Dyer and Charles L. Jones, Beaver, Pa., assignors to Westinghouse Electric Corporation, East Pittsburgh, Pa., a corporation of Pennsylvania Application June 18, 1952, Serial No. 294,220

3 Claims. (Cl. 339—64)

This invention relates to electrical devices in general and more particularly to terminal constructions for electrical devices such as circuit breakers.

In the construction of circuit breaker penelboards and switchboards for controlling lighting and distribution feeder circuits the buses, which extend substantially the length of the panelboard or switchboard, and the bus straps to which the circuit breakers are to be connected are rigidly mounted on insulating members which are rigidly mounted on a metal supporting pan or frame and the pan or frame is then mounted on the bottom or rear wall of a panel box or other support. The circuit breakers are then rigidly mounted on the pan or frame and the terminals of the breaker are connected to the bus straps which are rigidly mounted on the buses and preformed to receive the terminal connectors on the circuit breakers.

The breaker terminals or terminal connectors are usually secured to metal inserts molded into the molded insulating housing of the breaker by means of screws which also connect the breaker terminals to the bus straps. Unless the openings in the inserts and in the bus straps for receiving the terminal screws are in accurate alignment, stresses are set up when the parts are forced into alignment which frequently result in breakage of the molded insulating housing of the circuit breaker. Misalignment of the openings for receiving the terminal screws may be caused by variations in manufacture and/or assembly of the parts. Such misalignment may also be caused by improperly located holes in the supporting pans for receiving the breaker mounting bolts or the buses or bus straps may be deformed during shipment or handling.

A further difficulty with prior constructions has been that the terminal connectors have been exposed, with the resulting hazard of electric shock to anyone making connections to the breaker while the bus to which it is connected is energized, as is sometimes necessary. On multi-pole breakers such exposed terminal connectors may be accidentally bridged by a conducting member, such as a tool, with the result that there will be a phase-to-phase short circuit causing an interruption of electrical service.

It is, therefore, an object of the invention to provide a circuit breaker embodying an improved terminal structure and mounting therefor for connecting the circuit breaker in an external circuit.

Another object of the invention is to provide a circuit breaker embodying an improved terminal connector mounting device that is supported for limited movement relative to the breaker housing.

A further object of the invention is to provide a circuit breaker embodying an improved terminal structure and mounting therefore for connecting a circuit breaker in an external circuit without introducing any stress or strain on the circuit breaker housing.

Another object of the invention is to provide a circuit breaker embodying an improved terminal connector mounting device that is supported for limited movement relative to the circuit breaker housing whereby the circuit breaker is connected to a rigid bus without introducing stresses or strains in the circuit breaker housing.

It is also an object of the invention to simplify and reduce the cost of molded housings for circuit breakers by eliminating the need for molding threaded inserts in the ends of the housing members for the breaker terminals, which inserts had to be accurately positioned during the molding process.

Another object of the invention is to provide a circuit breaker embodying a protective cover for the breaker terminals for preventing accidental contact with a live line terminal.

A further object of the invention is to provide a circuit breaker embodying an insulating cover for the terminals of the breaker, the cover being provided with openings for the insertion of a tool and so disposed as to prevent simultaneous contact of the tool with adjacent terminals.

The invention, both as to structure and operation together with additional objects and advantages thereof, will be best understood from the following detailed description thereof when read in connection with the accompanying drawings.

In said drawings:

Figure 1 is a sectional view of a lighting or power distribution panelboard showing a plurality of circuit breakers mounted therein and embodying the improved terminal construction and connected to the buses and load conductors thereof.

Fig. 2 is a vertical sectional view of a portion of a circuit breaker and a portion of the panelboard showing the improved terminal arranged for rear connection.

Fig. 3 is a sectional view of a portion of a circuit breaker showing the improved terminal arranged for load connection.

Fig. 4 is a detail plan view of the terminal for rear connection.

Fig. 5 is a sectional view of the terminal shown in Fig. 4 taken on line V—V of Fig. 4.

Fig. 6 is a vertical sectional view of the load terminal taken on line VI—VI of Fig. 3.

Fig. 7 is a fragmentary plan view of an end of a circuit breaker showing the protective covering for the terminals of the breaker.

Fig. 8 is an end view of the circuit breaker partly in section showing the terminals and the protective covering therefor, and the means for mounting the protecting cover.

Fig. 9 is a vertical sectional view through one of the deformable retainers for holding the protective covering in place.

Fig. 10 is a sectional view of a portion of a circuit breaker embodying the improved terminal having a stud mounted therein for connecting the circuit breaker in a switchboard.

Fig. 11 is a fragmentary view showing a modification of the protective cover for the terminals.

Figure 12:
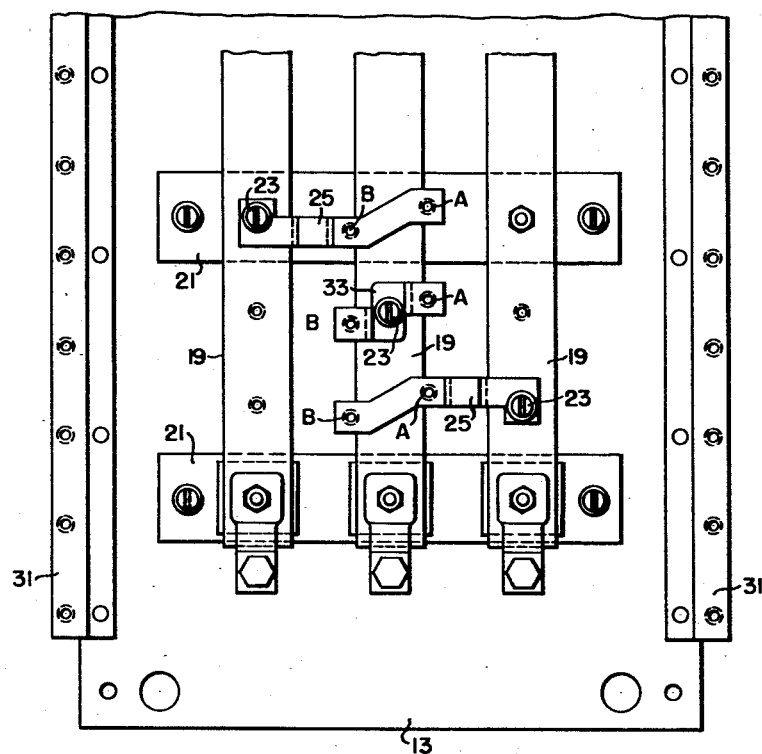
Fig. 12 is a plan view of a panelboard showing the bus bars and the bus straps for connecting the bus bars to the terminals of the circuit breakers.

Since the operating mechanism and other features of the circuit breaker are fully shown in patents, such for example as Dorfman No. 2,265,030, issued December 2, 1941, only those parts of the circuit breaker which embody new features of the invention are shown in detail.

Referring to Fig. 1 of the drawings, the circuit breakers 9 are adapted to be mounted side by side in a plurality of rows in a panel box 11 which includes a mounting pan 13 spaced from the bottom or rear wall of the box by insulating strips 15 and secured to the rear wall by screws 17. A plurality of conductor buses 19 (Fig. 12) are mounted on insulating strips 21 and are rigidly secured to the insulating strips by means of screws 23 which also rigidly secure bus straps 25 and 33 to the bus bars 19. The buses 19 are centrally disposed in the panel box and extend parallel to one another. The circuit breakers 9 (Fig. 1) are mounted in two rows in the box by means of mounting bolts 27 which pass through openings in the casing of the circuit breaker and through spacer sleeves 29 and engage threaded openings in brackets 31 mounted on the edges of the pan 13 and in threaded openings in the pan. The line end portions of the circuit breakers are disposed transversely above the buses 19. The line terminals of each breaker are thus located above the buses and each line terminal is adapted to be connected to one of the buses in the manner shown in Figs. 1 and 2. Straps 33 of U-shape (Fig. 1) may be mounted at intervals along the center bus 19 for connecting the center bus to certain of the breakers, or to certain poles of the breaker if multi-pole breakers are involved, while straps 25 connect the outer buses to the line terminals to be connected to the outer buses. A cover plate 35 is removably mounted on the open side of the panel box 11 by means of screws 37.

Referring to Fig. 12 it will be seen that the bus straps each has two holes therein indicated at A and B. The right hand holes A receive the screws 43 for connecting the line terminals of the three poles of the right hand breaker to the bus straps and the left hand holes B receive the screws 43 for connecting the line terminals of the left hand breaker to the bus straps. The upper and lower bus straps 25 connect the outer poles of both breakers respectively to the left and right bus bars 19 and the bus strap 33 connects the center pole of each breaker to the center bus bar 19. The three line terminals of each of the breakers are connected to the bus straps as shown in Fig. 2.

Referring now to Fig. 2 of the drawings, a conducting terminal strip 39 for connecting the circuit breaker in an external circuit is connected by means of an insert 41 and a terminal screw 43 to the bus strap 25 which is rigidly connected to the bus 19. The opening 45 in the conductor 39 and the opening 47 in the insert 41 (see also Fig. 5), for receiving the terminal screw are slightly larger than the diameter of the screw. The screw 43 threadedly engages in a tapped hole in the bus strap 25 and when tightened forms a good electrical connection and a rigid mechanical connection between the bus strap 25, the insert 41 and the conducting strip 39 which is rigidly mounted on the base 52 of the circuit breaker housing.

The insert 41 is loosely mounted in an opening 49 in the projecting end 51 (Figs. 2 and 5) of the base 52 of the circuit breaker housing and is loosely supported therein by a shoulder 53 on the insert and by a spring washer 55 engaging in an annular groove 57 in the insert 41. It will thus be seen that the insert 41 is movable axially and laterally a limited amount relative to the breaker housing. Loosely mounting the insert 41 in the molded insulating housing of the breaker permits alignment of the openings in the parts for receiving the terminal screw without placing undue stress on the molded material.

In some installations the terminals at the load end of the breakers are connected to rigid buses or heavy, stiff cables which may also place undue stress on the insulating breaker housing. Often, the load terminals of the breakers are front connected as shown in Fig. 1, that is, with the cables or straps connected in terminal connectors at the front of the breaker housing. As viewed in Figs. 3 and 6, a solderless connector 59 is rigidly secured by means of a screw 61 on an insert 41, like the insert shown in Figs. 2, 4 and 5, which is loosely mounted in the projecting portion 51 of the molded housing of the circuit breaker 9. The connector 59 is rectangular in shape and the top portion is provided with a threaded opening as at 63, Fig. 6, for receiving a clamping nut 65, the threads extending inwardly on the end portion of the connector as shown. The end of a cable or strap 67 is inserted in the open side of the connector 59 and the clamping nut tightened down as shown in Fig. 6.

The connector 59 is provided with an aligning and connecting member 69 having formed over portions 71 (Fig. 6) which straddle the conducting strip 39 and formed portions 73 the ends of which extend into the opening in the connector 59 to provide a good mechanical connection between the connector and the member 69 and a good electrical connection between the strap or cable 67 and the conducting strip 39.

By loosely mounting the metal insert 41 in the portion 51 of the molded insulating housing of the breaker, a limited amount of movement is permitted by the connector 59 relative to the molded housing. This arrangement prevents breakage of the breaker housing due to stresses caused by misalignment of the parts or stresses on the strap or cable.

Figure 10 illustrates a rear connecting stud 91 for connecting the circuit interrupter to the bus of a switchboard, the stud 91 being shown connected to a bus 93 having an opening therein for receiving the stud which is out of alignment with the opening in the terminal strip 39 on the breaker. The stud 91 is rigidly clamped to the terminal strip 39 and to the metal insert 41 by means of nuts 95 and a lock nut 97. The lower end of the stud 91 is rigidly clamped to the bus 93 by means of nuts 99.

It will be observed that the center line of this stud 91 is out of normal due to the misalignment of the openings in the terminal strip 39 and in the bus 93. It will also be seen that the terminal strip 39 and the bus 93 are slightly bent by tightening the nuts 95 and 99. By loosely mounting the insert 41 for limited movement relative to the portion 51 of the base 52 the stud 91 may be inserted in the misaligned openings in the terminal strip 39 and the bus 93 and the clamping nuts tightened with the stud in the position illustrated in Fig. 10 without placing any undue stress on the portion 51 of the base of the housing.

Another feature of the invention is the provision of a protective cover or guard for the terminals of the breakers at the line end thereof which prevents accidental contact with the terminals of the breaker. It is sometimes necessary to make connections to the breaker from an energized bus. Under such conditions, and because of the exposed terminals of the breaker, accidental contact may be made simultaneously with adjacent terminals. This might result in serious or even fatal injury to the person working on the job. To prevent such accidents there is provided a protective cover or guard for the line terminals of the breaker which, while permitting access to each individual terminal, prevents simultaneous accidental contact with adjacent terminals.

The base 52 of the breaker is longer than the cover 54, providing projecting end portions for supporting the breaker terminals. The cover 54 may be sealed to the base 52 by a sealing compound 60 poured over the heads of the screws 62 which hold the base to the cover to prevent tampering with the breaker mechanism and changing of the breaker calibration. By having the electrical terminals on the end portions of the base which project beyond the ends of the cover, the electrical connections may be made to the terminals without breaking the seal and removing the cover. The projecting end portions of the base 52 have three recesses 56, in each of which one of the terminals is positioned. The raised or projecting portions 58 on the projecting ends of the base 52 between the terminals and at the sides of the outer terminals form barriers between adjacent terminals.

The protective cover 75 (Figs. 1, 2, 3, 7 and 8) may be molded or formed of sheet insulating material in substantially the undulating configuration shown in Fig. 8. The raised portions 77 of the cover 75 coincide with the recessed portions 56 of the breaker base in which the terminals are disposed, and the portions 79 rest on the raised barrier portions 58 of the base of the breaker housing. The protective cover 75 is removably fastened to the base 52 of the breaker by means of deformable resilient plugs 81 of rubber or a rubber-like material closed at one end and having a flange 83 at the other end. The plugs 81 are inserted in openings 85 in the barrier 58 by inserting a blunt tool into the open end of the plugs and forcing the plugs into the openings 85 through matching openings in the cover 75 until the flange 83 engages the cover. The plugs, which are normally somewhat larger in diameter than the openings 85, are thus deformed or stretched out so that they will pass into the openings 85, and, upon removal of the tool, the inherent resiliency of the plugs tends to restore them to their normal diameter thus providing pressure against the walls of the openings to frictionally hold the plugs and due to the flanges 83, the cover 75 in place.

Each of the raised portions 77 of the cover 75 is provided with an access opening 87 in alignment with the corresponding terminal screw 43 so that a screw driver or other suitable tool can be inserted to turn the screws 43. By this arrangement it is necessary to insert the tool through the hole 87 in substantially axial alignment with the screw 43 which makes it impossible, or greatly reduces the danger of accidentally bringing the tool into simultaneous contact with adjacent terminals.

In the form of the cover shown in Fig. 8 the raised portions 77 makes possible interchanging or applying the cover 75 to both the line end of the breaker (Fig. 2) or the load end (Fig. 3), the raised portions 77 being such as to accommodate the terminal connectors 59 at the line end. It will be obvious that if the cover is to be applied to the line end only of the breaker the raised portions 77 could be eliminated and the cover could be constructed to extend straight across the terminal recesses of the housing, as shown at 89 in Fig. 11 of the drawings. The cover 75 does not extend over the ends of the breaker at the terminals so that it does not interfere with the wires or cables which may be connected to the terminals.

By loosely mounting the metal insert in the breaker housing for limited movement relative thereto, breakage of the molded insulating housing due to stresses resulting from misalignment of the parts is eliminated or greatly reduced, and the provision of the protective cover for the breaker terminals eliminates or greatly reduces the possibility of a person's hand accidentally touching a live terminal, or of bringing a tool into simultaneous contact with the terminals of adjacent phases of the circuit, thus providing a safe and trouble-free terminal structure for the circuit breaker.

Having described the invention in accordance with the provisions of the patent statutes, it is to be understood that various changes and modifications may be made in the structural details and arrangement of parts thereof without departing from some of the essential features of the invention.

We claim as our invention:

1. In a circuit interrupter, a base of insulating material, a conducting terminal strip at the upper side of the base of insulating material and extending outwardly toward one end thereof, an opening through the outer end portion of said terminal strip, an opening through the base of insulating material to the under side thereof under the outer end portion of the terminal strip, an insert of conducting material extending through said opening through the base and having its upper end surface engageable with the under side of the terminal strip and having its lower end surface exposed at the under side of the base for engagement by another conducting member, an opening through said insert from its upper end to its lower end, a solderless connector at the upper side of said terminal strip and having a wire-receiving opening facing outwardly adjacent the end of the base of insulating material and having a clamping screw for holding a wire in said wire-receiving opening thereof, a threaded member in said openings in the insert and terminal strip and removably securing the solderless connector at the upper side of the terminal strip for ready removal therefrom while said insert remains in place whereby electrical connection can be made to the lower end of the said insert after said solderless connector is removed, said insert being loosely mounted in the opening through the base of insulating material and being movable a limited amount relative thereto to relieve the insulating material of the base from stresses applied to the insert.

2. In a circuit interrupter, a base of insulating material, a conducting terminal strip at the upper side of the base of insulating material and extending outwardly toward one end thereof, an opening through the outer end portion of said terminal strip, an opening through the base of insulating material to the under side thereof under the outer end portion of the terminal strip, an insert of conducting material extending through said opening through the base and having its upper end surface engageable with the under side of the terminal strip and having its lower end surface exposed at the under side of the base for engagement by another conducting member, an opening through said insert from its upper end to its lower end, a solderless connector at the upper side of said terminal strip and having a wire-receiving opening facing outwardly adjacent the end of the base of insulating material and having a clamping screw for holding a wire in said wire-receiving opening thereof, a threaded member in said openings in the insert and terminal strip and removably securing the solderless connector at the upper side of the terminal strip for ready removal therefrom while said insert remains in place whereby electrical connection can be made to the lower end of said insert after said solderless connector is removed, said insert being loosely mounted in the opening through the base of insulating material and being movable a limited amount relative thereto to relieve the insulating material of the base from stresses applied to the insert, means independent of said terminal strip, independent of said solderless connector and independent of said threaded member for holding said insert in the opening through the base of insulating material, said holding means retaining said insert in the opening through the base after removal of the solderless connector and the threaded member which removably secured it in place.

3. A circuit interrupter having a housing comprising a base of insulating material and a cover of insulating material sealed to the base, said base of insulating material having at least one end extending endwise beyond said cover of insulating material, barriers integral with said end of the base of insulating material and extending beyond the sealed cover of insulating material and having recesses between the barriers, terminals in said recesses each having a screw positioned beyond the end of the cover of insulating material for clamping a wire to the terminal to permit connecting the interrupter in an electrical circuit without removing the sealed cover of insulating material, a terminal guard comprising a single member of insulating material mounted on said extended end of the base of insulating material, said terminal guard of insulating material being positioned across and resting on said barriers and being positioned above said terminals and clamping screws to protect against accidental contact therewith, one or more openings in said barriers, one or more openings in said terminal guard in line with the one or more openings in the barriers, one or more members of resilient insulating material inserted through the one or more openings in the terminal guard and into the one or more openings in the barriers and frictionally engaging the walls of the opening in the barrier to removably hold the terminal guard in place on the barriers, said terminal guard being removable to give full access to said terminals while said cover of insulating material remains sealed to the base of insulating material.

References Cited in the file of this patent

UNITED STATES PATENTS

| | | | |
|---|---|---|---|
| 2,007,174 | Benjamin | July 9, | 1935 |
| 2,139,244 | Nauert | Dec. 6, | 1938 |
| 2,172,218 | Mylius | Sept. 5, | 1939 |
| 2,199,626 | Freese | May 7, | 1940 |
| 2,317,710 | Anderson | Apr. 27, | 1943 |
| 2,401,223 | Buchanan | May 28, | 1946 |
| 2,412,259 | Graves | Dec. 10, | 1946 |
| 2,419,683 | Henschke | Apr. 29, | 1947 |
| 2,506,615 | Rosen | May 9, | 1950 |
| 2,588,558 | Mosiman | Mar. 11, | 1952 |
| 2,592,299 | Lewis | Apr. 8, | 1952 |
| 2,615,949 | Hecking | Oct. 28, | 1952 |
| 2,623,087 | Latta | Dec. 23, | 1952 |
| 2,636,065 | Fiske | Apr. 21, | 1953 |

FOREIGN PATENTS

| | | | |
|---|---|---|---|
| 328,911 | Germany | Apr. 19, | 1921 |
| 381,178 | Great Britain | Sept. 29, | 1932 |